United States Patent
Heitmann et al.

[11] Patent Number: 6,007,140
[45] Date of Patent: Dec. 28, 1999

[54] SEALING ARRANGEMENTS

[75] Inventors: Carsten Heitmann, Scheessel; Gunther Wilmes, Geldern; Norbert Heller, Grefrath, all of Germany

[73] Assignee: Draftex Industries Limited, Scotland, United Kingdom

[21] Appl. No.: 08/796,907

[22] Filed: Feb. 6, 1997

[30] Foreign Application Priority Data

Feb. 7, 1996 [GB] United Kingdom .................... 9602502

[51] Int. Cl.⁶ ............................................ B60J 10/08
[52] U.S. Cl. ......................... 296/146.9; 296/210; 49/485
[58] Field of Search .................. 296/146.9, 210; 49/485, 488

[56] References Cited

U.S. PATENT DOCUMENTS

| | | | |
|---|---|---|---|
| 4,026,598 | 5/1977 | Koike | 296/146.9 |
| 4,457,111 | 7/1984 | Koike | 296/146.9 X |
| 4,581,851 | 4/1986 | Warner | 49/374 |
| 4,945,681 | 8/1990 | Nozaki et al. | 49/495 |
| 4,969,295 | 11/1990 | Nishikawa et al. | 296/146.9 X |
| 5,024,480 | 6/1991 | Petrelli | 296/146.9 |
| 5,038,521 | 8/1991 | Andrzejewski . | |
| 5,107,624 | 4/1992 | Passone | 296/149 X |
| 5,462,292 | 10/1995 | Yamane | 277/181 |
| 5,527,583 | 6/1996 | Nozaki et al. | 296/146.9 X |
| 5,649,405 | 7/1997 | Morihara et al. | 296/146.9 X |

FOREIGN PATENT DOCUMENTS

| | | | |
|---|---|---|---|
| 0 459 219 | 12/1991 | European Pat. Off. | B60J 1/17 |
| 2 580 326 | 10/1986 | France | E06B 3/62 |
| 2 645 901 | 10/1990 | France | B60R 13/06 |
| 2 714 334 | 6/1995 | France | B60J 10/04 |
| 195 17 756 | 12/1995 | Germany | B70J 5/04 |
| 1354140 | 5/1974 | United Kingdom | E06B 7/23 |
| 2293191 | 3/1996 | United Kingdom | B60J 10/06 |

Primary Examiner—Joseph D. Pape
Attorney, Agent, or Firm—Leydig, Voit & Mayer, Ltd.

[57] ABSTRACT

A sealing arrangement for sealing between a window frame carried by the upper part of a vehicle door and the frame of the door opening, comprises a sealing strip. An outer frame member of the window frame extends in a peripherally outward direction of the window opening and is curved-over in re-entrant form to define a rigid channel facing inwardly. The sealing strip has a locking portion comprising a flexible wall of a hollow chamber. The flexible wall can be partially depressed into the hollow chamber to enable the locking portion to pass into the rigid channel, whereafter the wall resiles to lock the sealing strip in position. The flexible material of the sealing strip has an integral sealing lip sealing against the window frame. The window frame supports a second rigid channel which in turn supports a flexible channel for receiving the window glass.

6 Claims, 3 Drawing Sheets

SEALING ARRANGEMENTS

BACKGROUND OF THE INVENTION

The invention relates to sealing arrangements. Embodiments of the invention, to be described in more detail below purely by way of example, are for sealing in motor vehicle bodies.

BRIEF SUMMARY OF THE INVENTION

According to the invention, there is provided a sealing arrangement for providing a seal between the frame of a window opening carried by the upper part of a vehicle body door and the frame of the door opening, comprising means carried by the window frame for defining a rigid channel, and a sealing strip made of flexible material for attachment to the window frame, the sealing strip having an integral locking portion arranged to enter the rigid channel, the locking portion terminating in wall means forming at least part of the wall of a hollow chamber in the locking portion whereby to enable the wall means to be at least partially depressed into the hollow chamber to enable the locking portion to enter the rigid channel, the wall means thereafter resiling to hold the sealing strip in position, the sealing strip including a sealing portion which extends between the window frame and the frame of the door opening when the sealing strip is mounted in position.

According to the invention, there is also provided a sealing arrangement for sealing between a frame of a window opening carried by the upper part of a vehicle door and the corresponding door frame, comprising a sealing strip made of flexible material, an outer window frame member having a first part extending in a peripherally outward direction from the window opening and curved over in re-entrant form to define a first rigid channel facing in a peripherally inward direction of the window opening and a second part extending in a peripherally inward direction of the window opening, an inner window frame member having a first part extending into the first rigid channel and attached to the first part of the outer frame member and a second part extending in a peripherally inward direction of the window opening, the two second parts supporting a second rigid channel, the flexible material of the sealing strip defining a locking portion having wall means forming part of the wall of a hollow chamber running longitudinally of the strip to enable the wall means to be partially collapsed into the hollow chamber to allow the locking portion to pass into the first rigid channel whereafter the material of the locking portion resiles to hold the sealing strip in position, the flexible material of the sealing strip also defining a sealing lip which extends between a peripherally outer surface of the window frame and the corresponding part of the door frame, and a window glass guiding and receiving channel made of flexible material and mounted within the second rigid channel.

According to the invention, there is further provided a sealing arrangement for sealing between a frame of a window opening carried by the upper part of a vehicle door and the corresponding door frame, comprising a sealing strip made of flexible material, an outer window frame member having a first part extending in a peripherally outward direction from the window opening and defining one side wall of a first rigid channel facing in a peripherally outward direction of the window opening and a second part extending in a peripherally inward direction of the window opening and a second part extending in a peripherally inward direction of the window opening, an inner window frame member having a first part supporting the opposite side wall of the first rigid channel and a second part extending in a peripherally inward direction of the window opening, the two second parts supporting a second rigid channel, the flexible material of the sealing strip defining a locking portion having wall means forming part of the wall of a hollow chamber running longitudinally of the strip to enable the wall means to be partially collapsed into the hollow chamber to allow the locking portion to pass into the first rigid channel whereafter the material of the locking portion resiles to hold the sealing strip in position, the flexible material of the sealing strip also defining a sealing lip which extends between a peripherally outer surface of the window frame and the corresponding part of the door frame, and a window glass guiding and receiving channel made of flexible material and mounted within the second rigid channel.

DESCRIPTION OF THE DRAWINGS

Sealing arrangements embodying the invention, and for use in motor vehicle body construction, will now be described, by way of example only, with reference to the accompanying diagrammatic drawings in which.

DESCRIPTION OF PREFERRED EMBODIMENTS

Figure 1:
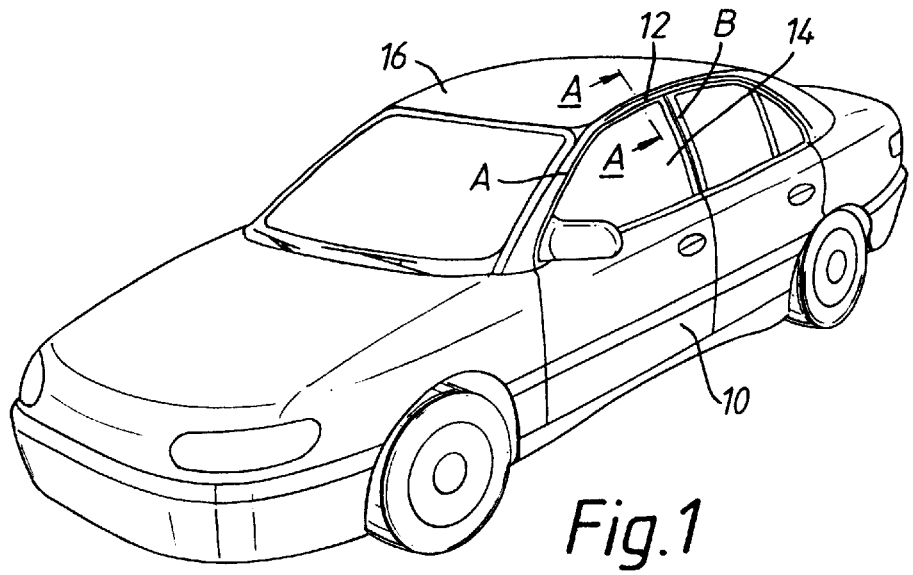
FIG. 1 is a perspective view of a motor vehicle.

The motor vehicle shown in FIG. 1 has a door 10 carrying an upper window frame 12 receiving a window glass 14. The door opening is defined by a door frame made up of the "A" and "B" pillars of the vehicle body, by the door sill, and by the roof 16.

Figure 2:
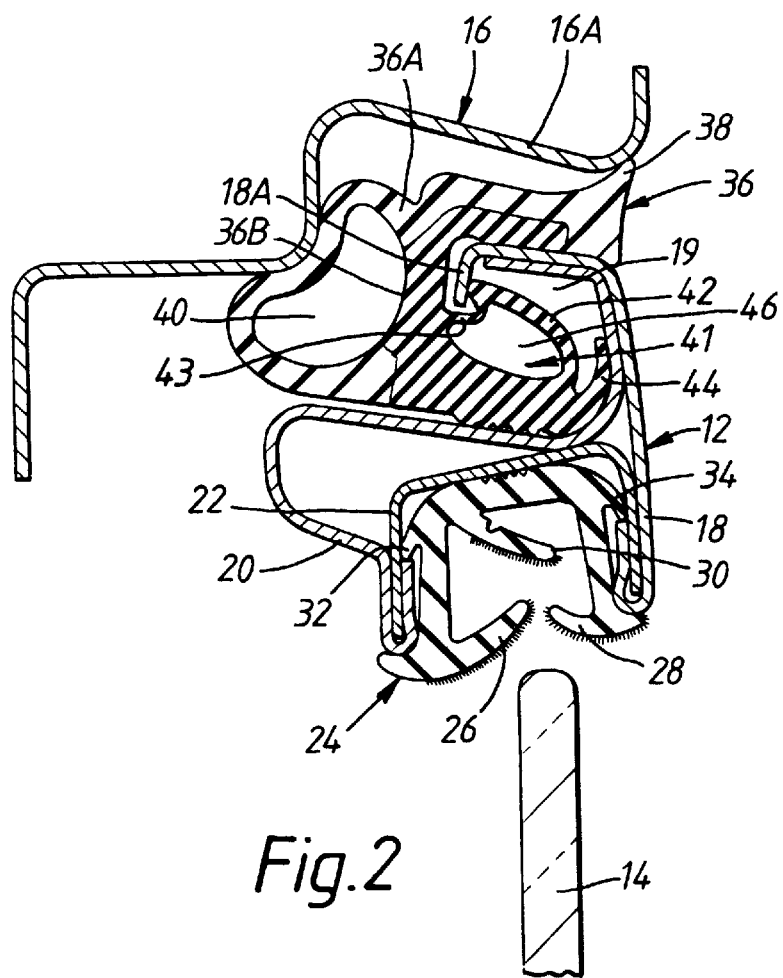
FIG. 2 is a section on the line A—A of FIG. 1, showing one of the arrangements.

FIG. 2, being a section on the line A—A of FIG. 1, shows the window frame 12 running around the window opening which receives the window glass 14. The window frame 12 is in this example made of metal and comprises outer and inner frame members 18 and 20 respectively. These frame members support a metal channel 22 and have curved-over ends for receiving, and which are welded to, the walls of the metal channel 22. The outer frame member 18 extends upwardly above the channel 22 where it meets the upper part of the inner frame member 20 and is welded to it. The outer frame member 18 has a curved-over rigid lip 18A so as to define a rigid channel 19 facing inwardly of the window opening.

The metal channel 22 receives and supports a window sealing, trimming and guiding channel 24. This is made of extruded plastics or rubber material, for example, and has lips 26 and 28 extending partway across its mouth for resiliently and sealingly contacting opposite sides of the window glass 14 as the latter rises upwardly during closure of the window. The outwardly facing surfaces of the lips 26,28 may be covered with flock.

A further sealing lip 30 is flexibly mounted at the base of the channel 24 for sealing against the edge of the glass 14.

The window channel 24 is fixed within the metal channel 22 by means of longitudinal shoulders 32,34 running along its outside side walls which engage against the edges of the curved-over outer and inner window frame members 18,20, so as to hold the channel 24 in position.

The window frame 12 also supports an outer door sealing indicated generally at 36. The purpose of the seal 36 is to provide a seal between the window frame 12 and the vehicle roof 16, the panel defining the roof at this position being indicated at 16A.

The seal 36 has a roof-engaging lip 38 which, when the door is closed (as shown in the Figure), provides a seal for the gap between the outer window frame member 18 and the roof panel 16A. In addition, the seal 36 has an integral sealing section 40 of generally hollow tubular form. When the door is closed, this sealing section 40 provides an additional seal against the roof panel 16A.

Seal 36 is secured in position on the window frame 12 by means of a locking portion 41 comprising a flexible longitudinally extending wall part 42, a second flexible longitudinally extending wall part 43, and a lip 44. The wall parts 42 and 43 form the outer wall of a hollow chamber 46 and comprises two parts generally inclined to each other and meeting at a ridge extending longitudinally of the seal. The hollow chamber 46 enables the wall part 43 to be hinged or depressed inwardly of the hollow chamber 46 so as to flex the wall part 42 and to collapse the chamber 46. This enables the seal 36 to be fitted over the rigid metal lip 18A, whereafter the wall parts 42 and 43 resile into the position illustrated and secures the seal 36 firmly in position.

The seal 36 is advantageously extruded from suitable plastics or rubber material. In the form shown in FIG. 2, the seal 36 is extruded from rubber material and is in two co-extruded parts: a relatively soft part 36A and a relatively harder part 36B. The harder part 36B provides added strength for the seal, particularly for holding it firmly in position in the window frame. In addition, the relatively harder part 36B strengthens the lip portion 38 and holds it firmly against separation from the upwardly facing outer surface of the outer frame member 18. Any such separation here might allow ingress of water or moisture.

Figure 3:
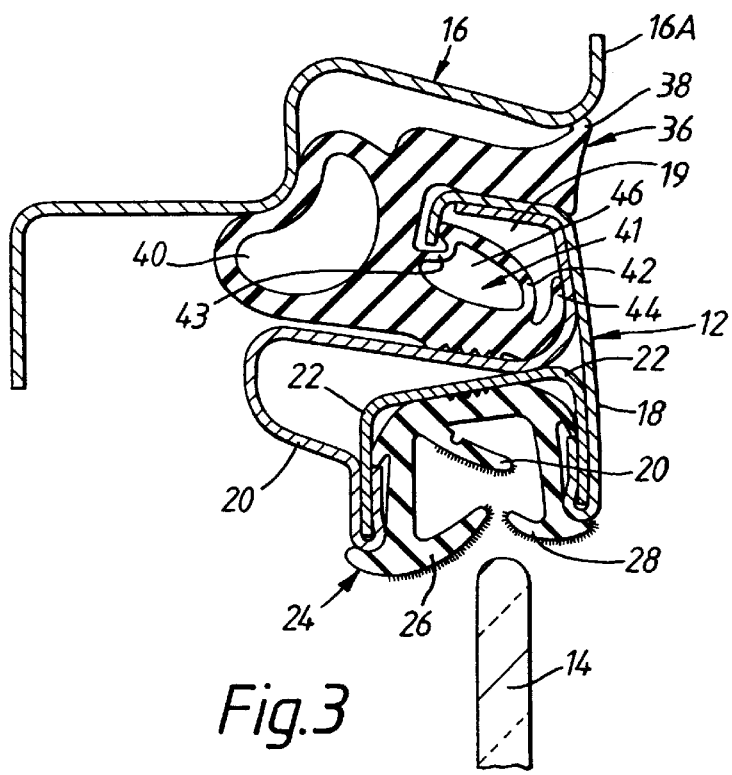
FIG. 3 is a section corresponding to FIG. 2 but showing a modified form of the arrangement of FIG. 2.

In FIG. 3, items corresponding to those in FIG. 2 are similarly referenced. In FIG. 3, the seal 36 is not extruded from hard and soft material 36A, 36B as in FIG. 2; instead, all the material is of the same hardness.

Figure 4:
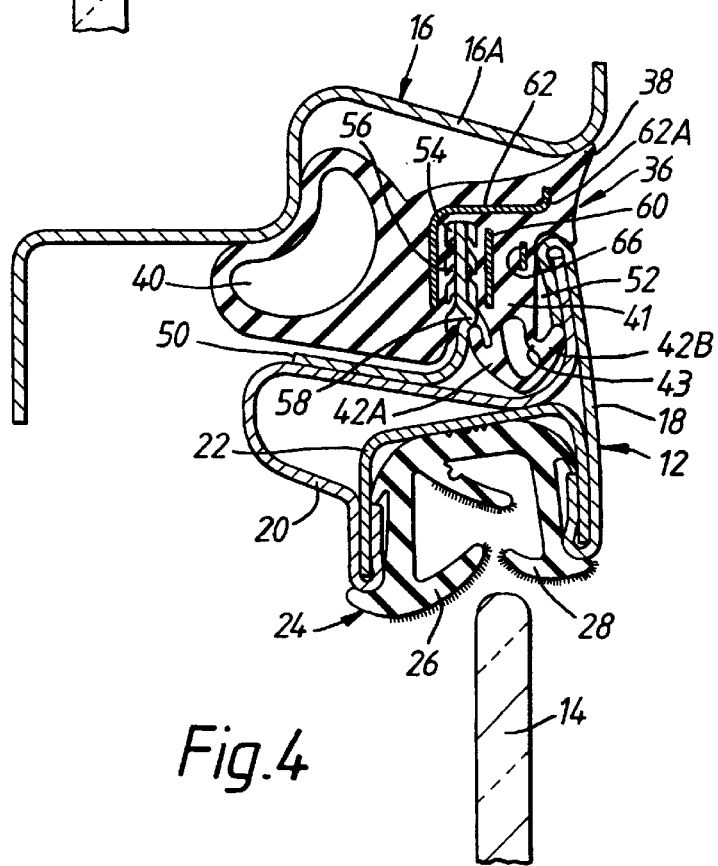
FIG. 4 is a section corresponding to FIG. 2 but showing another of the arrangements.

Items in FIG. 4 corresponding to items in the other Figures are similarly referenced.

In the arrangement shown in FIG. 4, the window frame 12 is of slightly different construction. The outer frame member 18 is not extended upwardly in re-entrant form to form the inwardly facing channel 19 of FIGS. 2 and 3. Instead, it is curved over on itself to receive, and be welded to, the inner frame member 20 on the outside of the window frame. In addition, the window frame has an extra frame member 50 which is welded to the inner frame member 20 and then extends upwardly so as to define one side wall of an outwardly facing channel 52 whose other side wall is defined by the flange formed where the outer and inner window frame members 18,20 are welded together.

In the arrangement of FIG. 4, the seal 36 is thus fitted in position by being moved vertically downward into the channel 52. The body of the seal 36 is thus extruded to provide a channel 54 for embracingly gripping the extra frame member 50. The channel 54 may be provided with integral gripping lips 56 for frictionally gripping opposite faces of the frame member 50.

The locking portion 41 in FIG. 4 extends downwardly into the channel 52 when the seal is fitted in position and comprises the hollow chamber 46 with two outwardly facing mutually inclined wall parts 42A and 42B, and a further wall part 43. When the locking portion 41 is inserted into the channel 52 (so that the channel 54 of the seal 36 embraces the frame member 50), the wall part 43 flexes inwardly of the hollow chamber and the hollow chamber 46 is partially compressed to allow the walls 42A,42B to enter the channel 52. When the seal is fully fitted, the material resiles and the wall parts 42A,42B expand outwardly so that their distal edges engage a longitudinal shoulder 58 on one side of the frame member 50 and the curved-over edge of the outer frame member 18. In this way, the seal 36 is firmly held in position.

The seal 36 includes reinforcements in the form of an embedded generally flat metal strip 60 and a separate metal strip 62 which is of right-angled form with a bent-over edge 62A extending into the lip 38. The reinforcement 62, and particularly its bent over edge 62A, reinforce the lip 38 and help to ensure that it remains properly seated on the distal edge of the bent-over outer frame member 18.

The reinforcements 60,62 may be made of unapertured metal strips. Instead, however, they may be apertured, such as provided with slots or slits, so as to increase their flexibility. They can be incorporated into the material of the seal 36 by means of a known cross-head extrusion process.

The material of the seal 36 also includes a subsidiary hollow chamber 66 which provides increased flexibility for easing the fitting of the seal into position.

Figure 5:
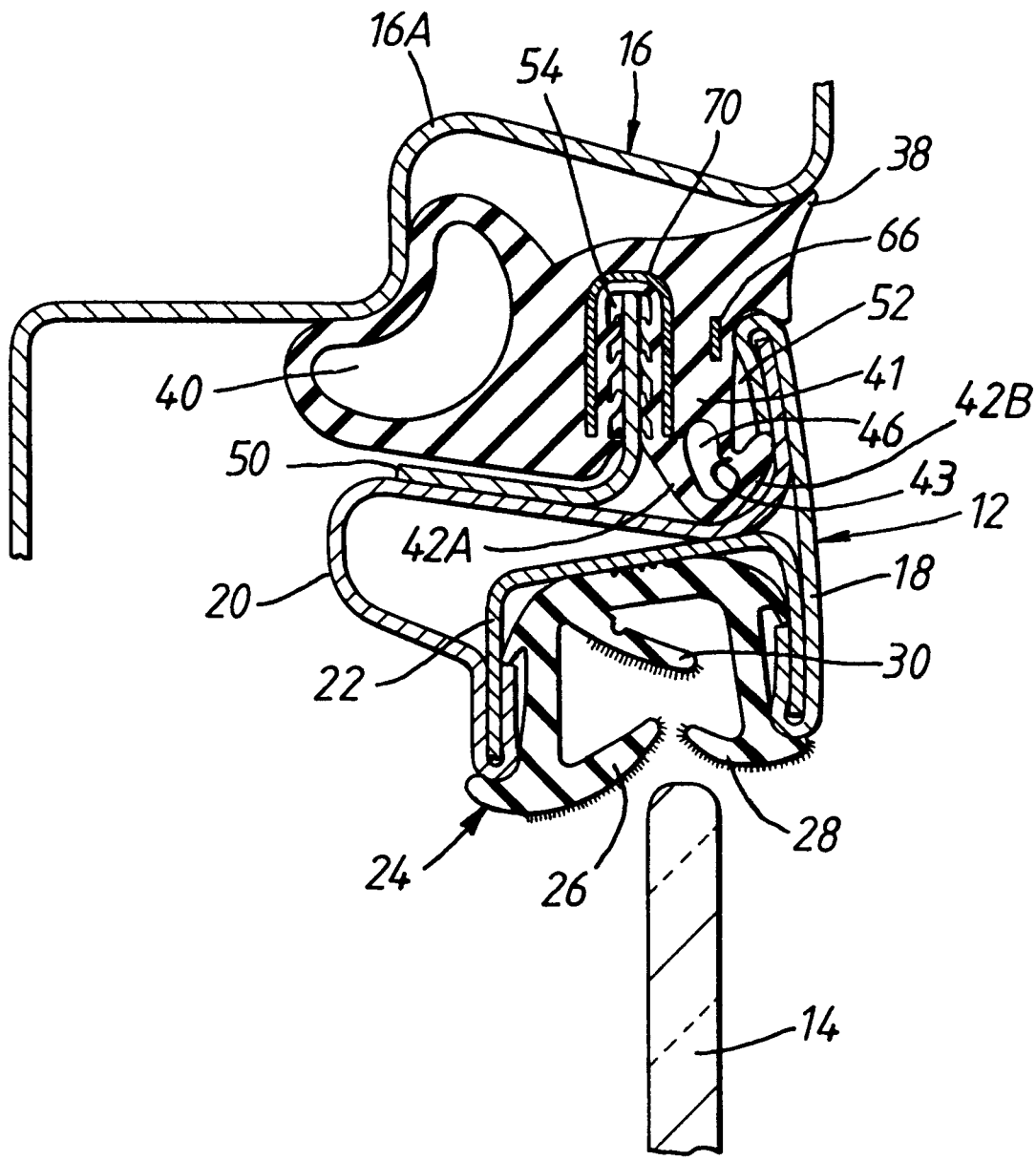
FIG. 5 is a section corresponding to FIG. 2 but showing a modified form of the arrangement shown in FIG. 4.

In the arrangement of FIG. 5, items corresponding to those in the other Figures are correspondingly referenced. In the arrangement of FIG. 5, the two separate reinforcements 60,62 are replaced by a single channel-shaped reinforcement or carrier 70 which embraces the channel 54.

The seal 36, as shown in each Figure, may be arranged to run not only along the top of the door but also along its sides.

What is claimed is:

1. In combination, a window frame carried by the upper part of a door of a vehicle body and a sealing arrangement for providing a seal between the window frame and a door frame carried by the vehicle body and framing a door opening which is closeable by the door, the window frame framing a window opening, said combination comprising support means on the window frame, a window guide channel supported on the support means, the window guide channel comprising a base, two side walls and an open mouth, the window guide channel being supported on the support means so that its open mouth faces towards, the centre of the window opening for receiving a pane of window glass for the window opening, means carried by the support means and positioned on the outside of the base of the window guide channel and defining a rigid support channel;

the sealing arrangement comprising a sealing strip made of flexible material having an integral locking portion arranged to enter the rigid support channel, the locking portion presenting to the rigid support channel a first wall part forming at least part of the wall of a hollow chamber in the locking portion, the first wall part being integral with a second wall part forming part of the wall of the locking portion, the second wall part being at least partially depressible into the hollow chamber so as to hinge the first wall part and to enable the locking portion to enter the rigid support channel, the first and second wall parts thereafter resiling to hold the sealing strip in position in the rigid support channel, the sealing strip including a sealing portion which extends in a direction from the window frame to the door frame when the sealing strip is mounted in position.

2. The combination according to claim 1, in which the rigid support channel has an open mouth facing towards the outside of the base of the window guide channel.

3. The combination according to claim 2, in which the rigid support channel is formed at least in part by a rigid member of the window frame which extends from the window guide channel in a direction away from and substantially parallel to the window opening, the rigid member being bent over towards the outside of the base of the window guide channel to define the rigid support channel.

4. The combination according to claim 1, in which the first and second wall parts of the locking portion comprise two wall parts generally inclined to each other and meeting at a ridge extending longitudinally of the strip.

5. The combination according to claim 1, in which the support means includes a second rigid channel in which is supported the window guide channel.

6. In combination, a window frame carried by the upper part of a door of a vehicle body and a sealing arrangement for providing a seal between the window frame and a door frame carried by the vehicle body and framing a door opening which is closeable by the door, the window frame framing a window opening;

the window frame comprising an outer window frame member having a first part on the outside of the vehicle body and extending in a direction generally parallel to the window opening and away from the window opening and then curved over towards the inside of the vehicle body and in a direction towards the window opening to define a first rigid channel facing towards the window opening and a second part integral with the first part and on the outside of the vehicle body and extending in a direction generally parallel to the window opening and towards the window opening and overlapping the window opening;

an inner window frame member having a first part on the inside of the vehicle body and extending into the first rigid channel and attached there to the outer frame member and a second part integral with the first part and on the inside of the vehicle body and extending in a direction generally parallel to the window opening and towards and overlapping the window opening, a second rigid channel supported by the two second parts and comprising a base and two side walls defining an open mouth facing towards the window opening; and a window glass guiding and receiving channel made of flexible material and mounted within the second rigid channel for receiving a pane of window glass for the window opening;

the sealing arrangement comprising a sealing strip made of flexible material, the flexible material of the sealing strip defining a locking portion presenting to the first rigid channel a first wall part forming part of a flexible wall of a hollow chamber running longitudinally of the strip, the first wall part being integral with a second wall part forming part of the wall of the hollow chamber, the second wall part being capable of flexing into the hollow chamber to hinge the first wall part to partially collapse the hollow chamber to allow the locking portion to pass into the first rigid channel whereafter the material of the first and second wall parts of the locking portion resiles to hold the sealing strip in position;

the flexible material of the sealing strip also defining a sealing lip which extends from the window frame towards and to contact the door frame.

\* \* \* \* \*